(12) United States Patent
Reid

(10) Patent No.: US 11,492,927 B2
(45) Date of Patent: Nov. 8, 2022

(54) OIL TANK SYSTEM

(71) Applicant: Rolls-Royce plc, London (GB)

(72) Inventor: Mark P. Reid, Derby (GB)

(73) Assignee: Rolls-Royce PLC, London (GB)

(*) Notice: Subject to any disclaimer, the term of this patent is extended or adjusted under 35 U.S.C. 154(b) by 873 days.

(21) Appl. No.: 16/389,107

(22) Filed: Apr. 19, 2019

(65) Prior Publication Data
US 2019/0338670 A1    Nov. 7, 2019

(30) Foreign Application Priority Data
May 3, 2018 (GB) .................................. 1807265

(51) Int. Cl.
| | |
|---|---|
| *F01D 25/18* | (2006.01) |
| *B01D 19/00* | (2006.01) |
| *B64D 27/10* | (2006.01) |
| *F01M 11/00* | (2006.01) |
| *F01M 11/08* | (2006.01) |

(Continued)

(52) U.S. Cl.
CPC ......... *F01D 25/18* (2013.01); *B01D 19/0057* (2013.01); *B64D 27/10* (2013.01); *F01M 11/0004* (2013.01); *F01M 11/08* (2013.01); *F02K 3/06* (2013.01); *F01M 2011/0033* (2013.01); *F01M 2011/0037* (2013.01); *F01M 2250/60* (2013.01); *F02C 7/36* (2013.01); *F05D 2220/323* (2013.01);

(Continued)

(58) Field of Classification Search
CPC ..... F01D 25/18; B01D 19/0057; B64D 27/10; F01M 11/0004; F01M 11/08; F01M 2011/0033; F01M 2011/0037; F01M 2250/60; F02K 3/06

See application file for complete search history.

(56) References Cited

U.S. PATENT DOCUMENTS

| | | | | |
|---|---|---|---|---|
| 7,618,482 | B2 * | 11/2009 | Richards | ............... F01M 11/00 96/208 |
| 2014/0069743 | A1 | 3/2014 | Xu | |

(Continued)

FOREIGN PATENT DOCUMENTS

| | | | | |
|---|---|---|---|---|
| EP | 2166196 A2 * | 3/2010 | ............. | B01D 45/16 |
| EP | 2166196 A2 | 3/2010 | | |

(Continued)

OTHER PUBLICATIONS

Search Report Under Section 17 issued in connection with GB1807265.2, dated Oct. 23, 2018, 1 page.
Search Report Citation Abstract associated with GB1807265.2, 2 pages.
Extended European Search Report dated Sep. 9, 2019 in connection with European Patent Application No. 19167054, filed applicant Rolls-Royce plc. (2 pages).

*Primary Examiner* — Syed O Hasan
(74) *Attorney, Agent, or Firm* — Simpson & Simpson, PLLC

(57) ABSTRACT

An oil tank system (100) for a gas turbine engine is provided. The oil tank system (100) includes an oil tank (102) having an upper tank portion (112) and a lower tank portion (114), a waisted section (118) being provided between the upper tank portion (112) and the lower tank portion (114). Oil is received by a de-aerator (104) of the system (100) which supplies de-aerated oil to the upper tank portion (112). The waisted section (118) includes an upper face (119) configured to catch oil drips from above the waisted section (118) and to guide oil to a lower face (121) of the waisted section (118).

17 Claims, 6 Drawing Sheets

(51) Int. Cl.
*F02K 3/06* (2006.01)
*F02C 7/36* (2006.01)
(52) U.S. Cl.
CPC ............... *F05D 2260/40311* (2013.01); *F05D 2260/608* (2013.01); *F05D 2260/98* (2013.01)

(56) References Cited

U.S. PATENT DOCUMENTS

2015/0176492 A1    6/2015  Cutrara et al.
2018/0135639 A1*   5/2018  Desjardins ............ F04D 29/063

FOREIGN PATENT DOCUMENTS

EP    2166196 A3    4/2011
FR    3020093       10/2015

\* cited by examiner

OIL TANK SYSTEM

CROSS-REFERENCE TO RELATED APPLICATIONS

This specification is based upon and claims the benefit of priority from United Kingdom patent application GB 1807265.2 filed on May 3, 2018, the entire contents of which are incorporated herein by reference.

BACKGROUND

Field of the Disclosure

The present disclosure relates to an oil tank system for a gas turbine engine, and more particularly but not necessarily exclusively for a gas turbine engine comprising a gearbox. The present disclosure also relates to a gas turbine engine including an oil tank system and an aircraft including a gas turbine engine including an oil tank system.

Description of the Related Art

Oil tank systems, particularly those in aircraft, are used to store oil from a part of an oil system such that the oil may be recirculated throughout the system. Scavenge pumps are used to extract the oil, but this often results in a mixture of air and oil, being extracted by the scavenge pump and being fed to the oil tank system. A known oil tank system 42 is shown in FIG. 4.

The known oil tank system 42 includes a de-aerator 44, which receives scavenged oil, which is aerated, and submits it to a de-aeration process in order to separate a majority of the air from the oil. This process may be achieved by inducing a vortex within the oil flow, the air that separates during the vortex then being released from the oil tank system 42 by a venting pipe 46. The deaerated oil can then pass out of the de-aerator 44 into an oil tank 48, from which it can be stored and then pumped out for use throughout an oil system (not shown). An oil level indicator 50 may be provided on the side of the oil tank 48, and may take the form of an indicator window 54, allowing an operator to view the level of oil within the oil tank 48. An electronic oil level sensor 56 is also provided, which provides an electronic measure of the oil level to an external device (not shown).

For various reasons, it may be required to provide an oil tank system with a larger capacity than known oil tanks. Where this larger capacity results in a significantly extended vertical extent of the oil tank, it has been noted that oil leaving the de-aerator and being deposited in the oil tank may fall a substantial distance from the de-aerator, depending on the oil level within the oil tank, resulting in agitation of the oil surface, oil splash, partial reaeration of the oil, and an unrepresentative indicated oil level, which is undesirable.

It is therefore an object of the present invention to provide an improved oil tank system in view of the above or at least to provide a useful alternative.

BRIEF SUMMARY OF THE DISCLOSURE

According to a first aspect, there is provided an oil tank system for a gas turbine engine, the oil tank system comprising;

an oil tank having an upper tank portion and a lower tank portion, the lower tank portion including an oil tank outlet; and a de-aerator configured to receive scavenged oil from a scavenged oil supply inlet and remove air from the scavenged oil, a remainder of the scavenged oil passing to the upper tank portion;

wherein the oil tank includes a waisted section between the upper tank portion and the lower tank portion, the waisted section having an upper face configured to catch oil from above the waisted section and to guide oil to a lower face of the waisted section.

Oil from above the waisted section may include oil drips, for example from an outlet of the de-aerator, and oil film.

The oil tank may comprise a plurality of waisted sections defining at least one so intermediate tank portion. The oil tank may comprise a total of two to five waisted sections. The oil tank may therefore comprise a total of one to four intermediate tank portions.

The or each waisted section may therefore be in fluid communication with tank portions above and below it. As such, where a single waisted section is provided, the upper face will be configured to catch oil drips from the upper tank portion and guide oil to the lower tank portion via the lower face of the waisted section. Similarly, where multiple waisted sections are provided, each upper face will be configured to catch oil drips passing through the tank portion directly above (e.g. the upper tank portion or an intermediate tank portion) and guide oil to the tank portion directly below (e.g. an intermediate tank portion or the lower tank portion) via the lower face of the waisted section.

Of course, where multiple waisted sections are provided, a first waisted section may guide oil from the upper tank portion or an intermediate tank portion to an intermediate tank portion and a second waisted section may guide oil from the intermediate tank portion to a further intermediate tank portion or the lower tank portion, as the tank portion directly below the first waisted section may be directly above the second waisted section.

A surface of the waisted section may be configured to enhance oil adhesion.

The surface of the waisted section may comprise surface features for enhancing mechanical adhesion of oil to the surface. Such surface features may include micro-voids, channels, ridges, protrusions, or any other feature that is capable of increasing the adhesion of oil, in particular aviation oil. The size and shape of the surface features may be chosen to increase adhesion with a particular composition of oil.

The surface of the waisted section may comprise a material for enhancing dispersive adhesion of oil to the surface. The particular material chosen may be chosen to increase adhesion with a particular composition of oil.

The or each waisted section may include a sloped portion. The sloped portion may include a narrowing portion and a widening portion. The narrowing portion may be formed by the upper face and the widening portion may be formed by the lower face.

The or each waisted section may form a restriction aperture. The restriction aperture may comprise a boundary between the upper face and the lower face.

Adjacent restriction apertures may be horizontally-offset from each other for preventing the dripping of oil through two restriction apertures without contacting either waisted section.

The oil tank system may further comprise an air communication line between the upper tank portion and the lower tank portion or the intermediate tank portion.

The oil tank system may further comprise an oil level sensor and/or an oil temperature sensor.

The oil level sensor and/or the oil temperature sensor may be provided as a single unit within the oil tank.

The oil level sensor and/or the oil temperature sensor may be provided on the air communication line.

The oil tank may include at least one baffle. The or each baffle may be configured to reduce swirling of oil within the oil tank.

The or each baffle may be substantially vertical and may extend from the base of the lower tank portion and may be configured to reduce swirl within the lower tank portion. Additional baffles may extend from the waisted sections and may be configured to reduce swirl within the upper tank portion and/or the intermediate tank portion(s).

The de-aerator may include a venting pipe for the removal of air.

According to a second aspect, there is provided a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and an oil tank system according to the first aspect.

The gas turbine engine may further comprise a gearbox that receives an input from the core shaft and outputs drive to the fan so as to drive the fan at a lower rotational speed than the core shaft.

The oil tank system may deliver oil to and/or scavenge oil, directly or indirectly, from the gearbox.

The turbine may be a first turbine, the compressor may be a first compressor, and the core shaft may be a first core shaft.

The engine core may further comprise a second turbine, a second compressor, and a second core shaft connecting the second turbine to the second compressor.

The second turbine, second compressor, and second core shaft may be arranged to rotate at a higher rotational speed than the first core shaft.

According to a third aspect, there is provided an aircraft including a gas turbine engine according to the second aspect.

The term "waisted section" as used herein denotes a section or cross-section of the oil tank that has a circumference that is smaller than the average circumference of the upper tank portion(s) and the lower tank portion(s) of the oil tank.

BRIEF DESCRIPTION OF THE DRAWINGS

Embodiments will now be described by way of example only, with reference to the Figures, in which.

DETAILED DESCRIPTION OF THE DISCLOSURE

Figure 1:
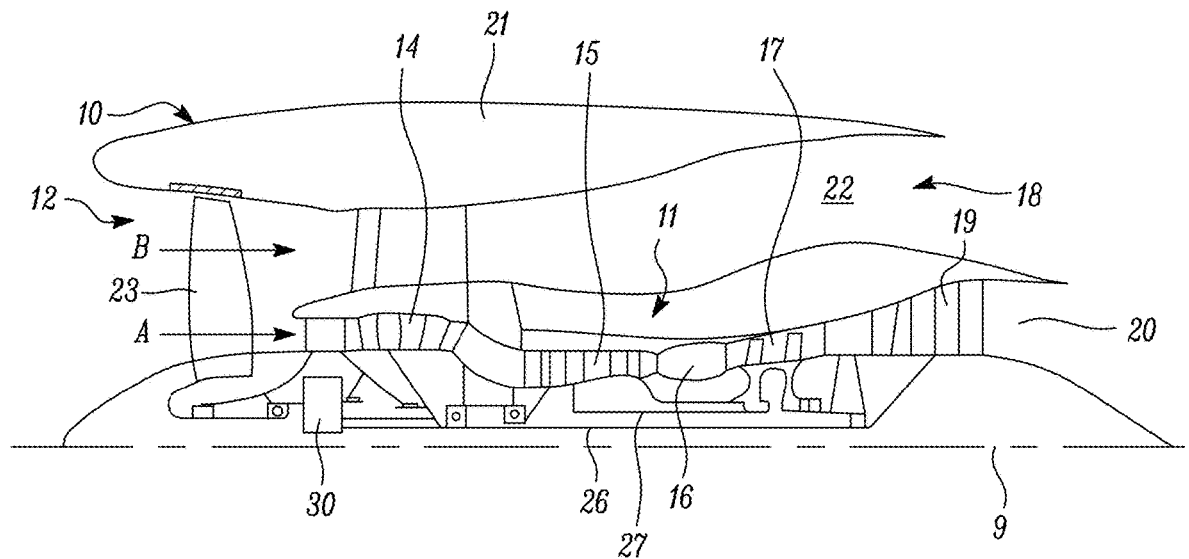
FIG. 1 is a sectional side view of a gas turbine engine.

As noted elsewhere herein, the present disclosure relates to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through and thereby drive the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
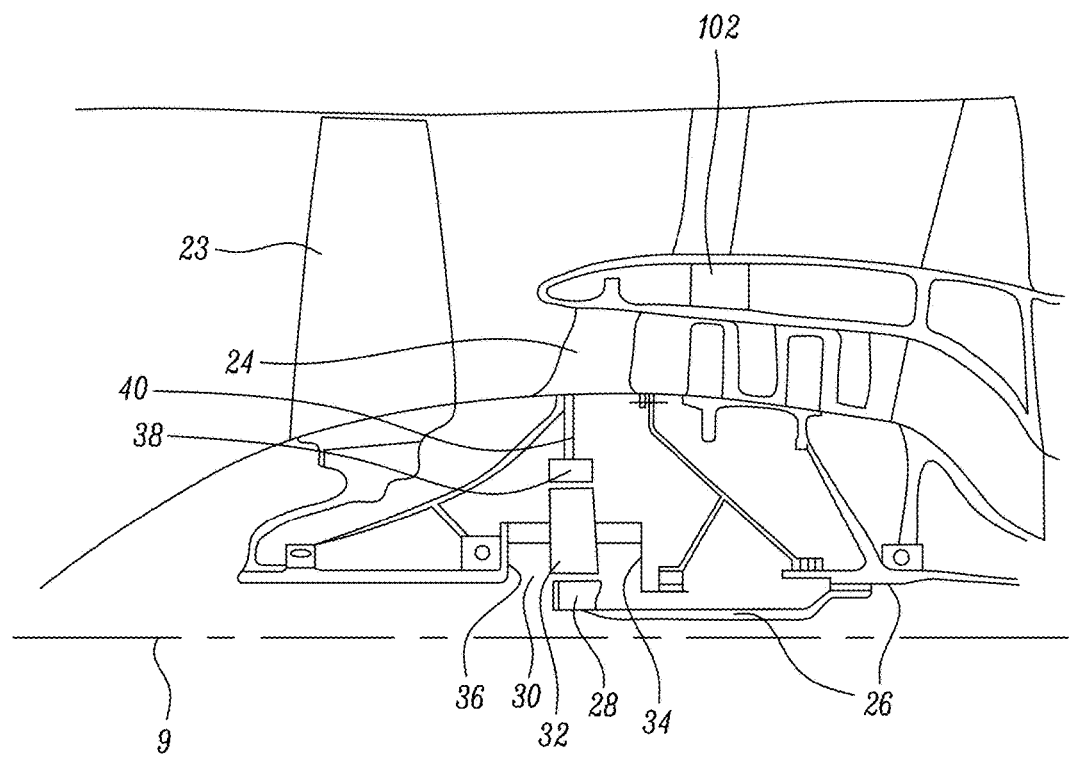
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
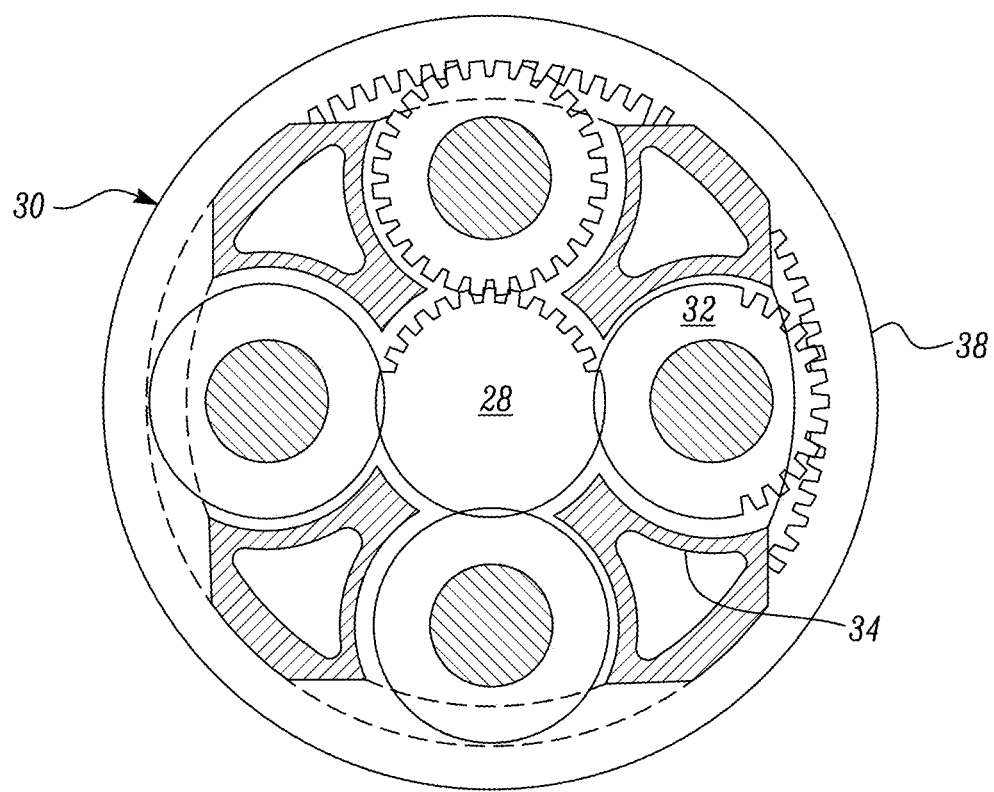
FIG. 3 is a partially cut-away view of a gearbox for a gas turbine engine.
Figure 4:
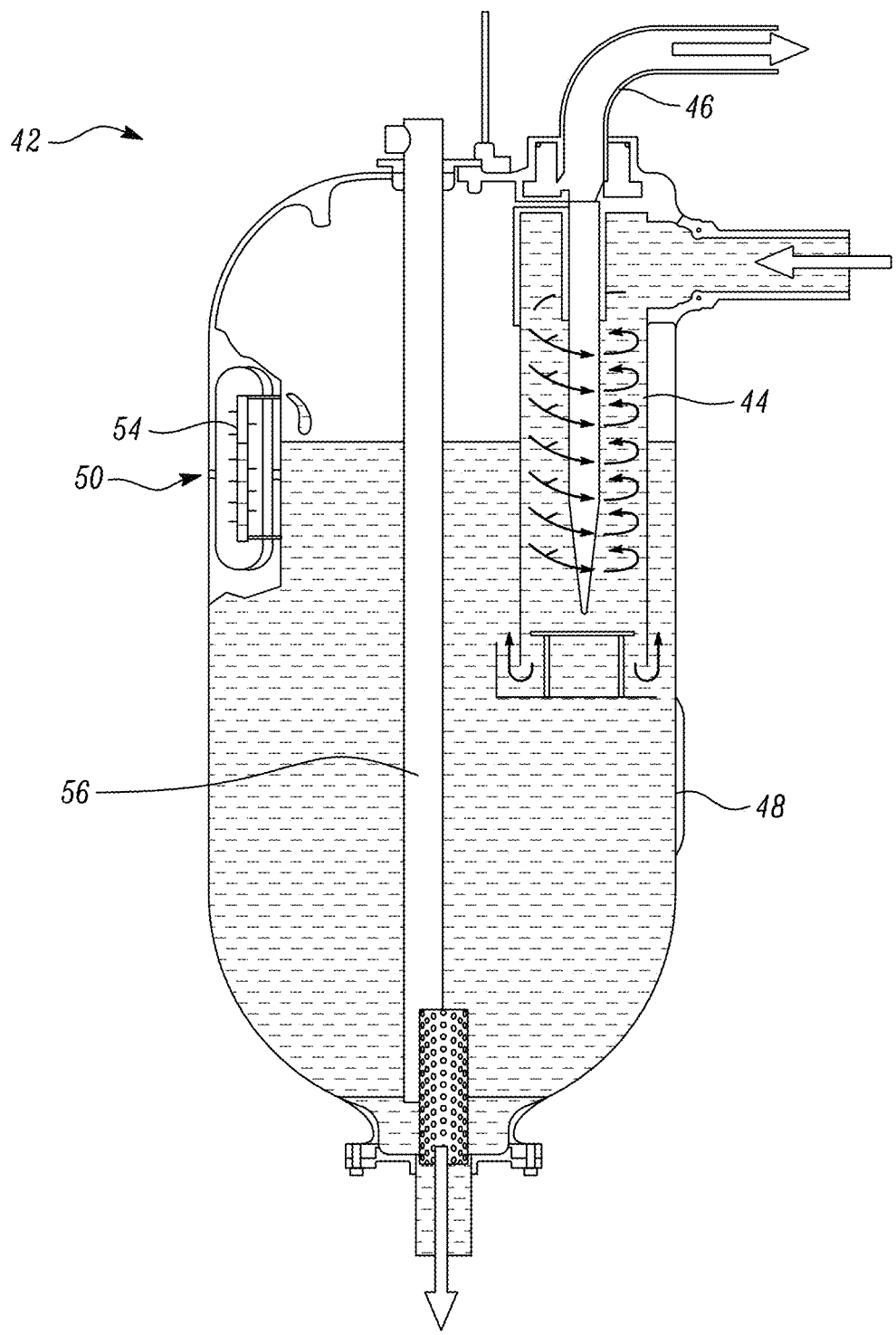
FIG. 4 is a sectional view of a known oil tank system.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Turning now more specifically to the oil tank system of the present disclosure that may be used in such a gas turbine engine.

Figure 5:
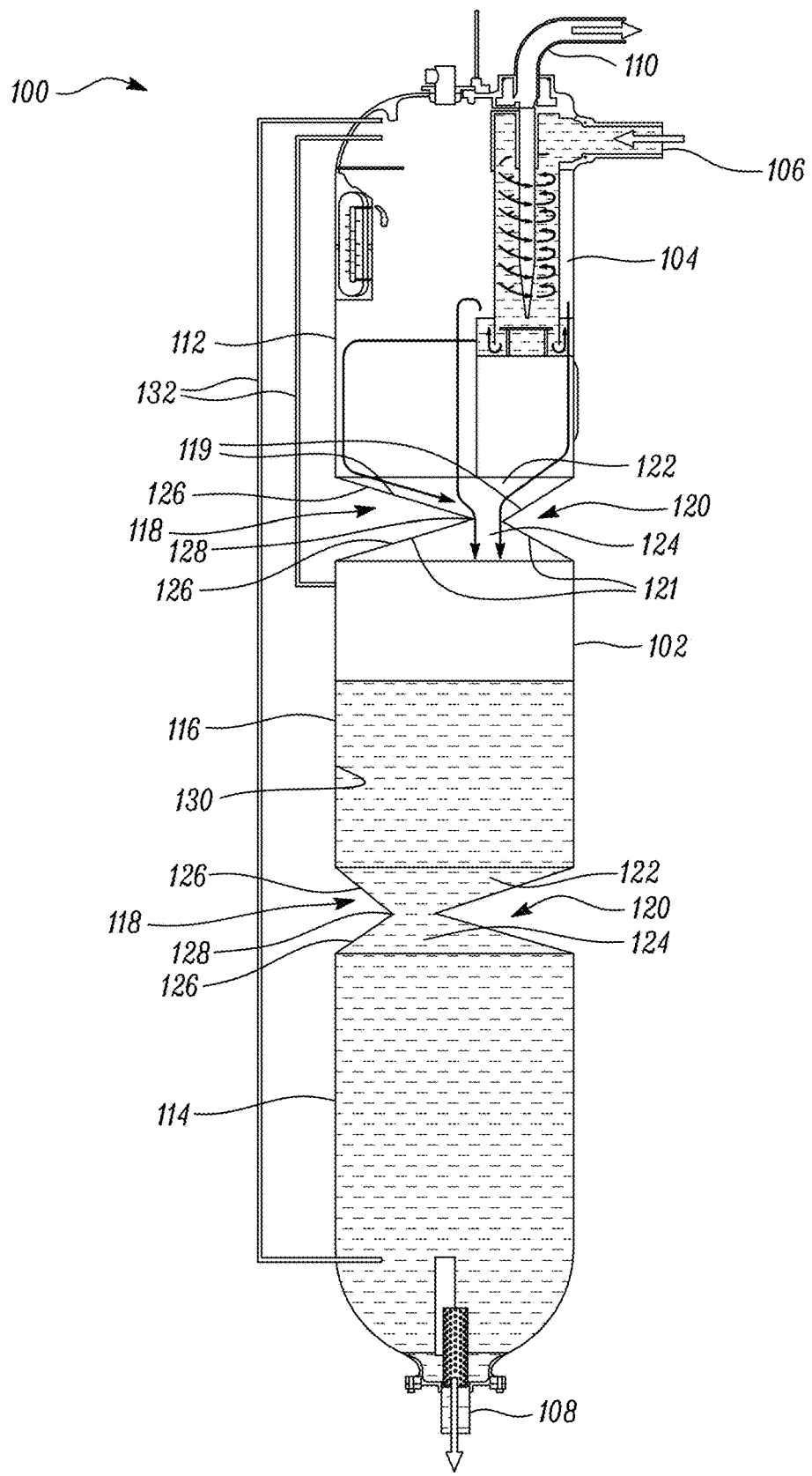
FIG. 5 is a sectional view of an oil tank system of the present disclosure.
Figure 6:
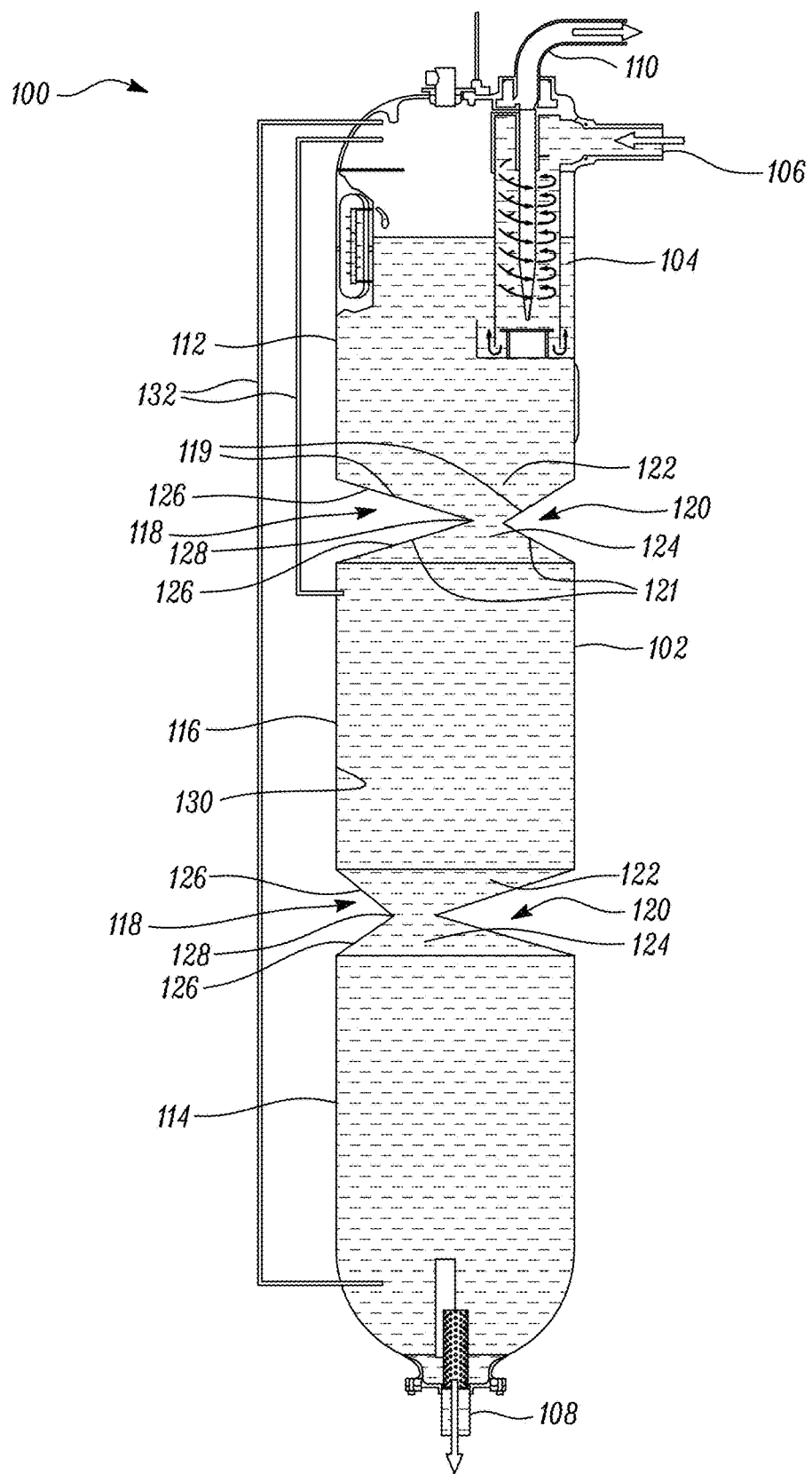
FIG. 6 is a sectional view of the oil tank system of FIG. 5, with an increased oil level.

FIG. 5 and FIG. 6 show an oil tank system 100 in accordance with the disclosure. The oil tank system 100 includes an oil tank 102 and a de-aerator 104 that receives scavenged oil from an oil system (not shown) via a scavenged oil supply inlet 106. The oil tank 102 includes an outlet 108 for delivery of oil to back to the oil system, for example via an oil pump. The oil tank 102 is also shown in situ within the gas turbine engine in FIG. 2.

The de-aerator 104 acts to remove air from the aerated oil that is scavenged from the oil system. The de-aerator 104 depicted achieves this by inducing a vortex within the scavenged oil, the vortex causing separation of oil and air entrained within the oil. The air is then removed from the de-aerator 104 via a venting pipe 110 and the oil passes from the de-aerator 104 into the oil tank 102. Although described in this manner, the de-aerator may take any form that achieves the same result, the possibilities being known to the skilled person.

The oil tank 102 comprises three portions: an upper tank portion 112, a lower tank portion 114, and an intermediate tank portion 116 interposed between the upper tank portion 112 and lower tank portion 114. The de-aerator 104 therefore delivers scavenged oil to the upper tank portion 112 of the oil tank 102, the oil then flowing through the oil tank 102 before reaching the level of the oil already held within the oil tank 102.

As the oil tank 102 is elongate, having a large vertical extent compared to its horizontal extent, if the oil level is relatively low, as shown in FIG. 5, the scavenged oil may have a relatively large length of the oil tank 102 to travel in order to arrive at the oil level. In order to limit oil surface agitation and re-aeration of the oil during this travel, or an even longer travel if the level of the oil is within the lower tank portion 114, the oil tank 102 includes two waisted sections 118, which define the intermediate tank portion 116 by providing its upper and lower extent.

Each waisted section 118 includes an upper face 119 and a lower face 121, the upper face 119 guiding oil on its surface to the lower face 121, in use. These surfaces are only labelled on the upper waisted section 118, for clarity, although they are present on both the upper and lower waisted sections 118. A sloped portion 120 of the waisted section 118 assists with the guiding of oil and has a narrowing portion 122 and a widening portion 124. As such, oil contacting the waisted section 118 is encouraged to flow down a surface 126 of the waisted section 118, adhering to the surface 126. In the present embodiment, the narrowing portion 122 is formed by the upper face 119 and the widening portion 124 is formed by the lower face 121.

The sloped portions 120 of the present embodiment terminate at restriction apertures 128, which form a boundary between the upper face 119 and the lower face 121 and act as gateways between the upper tank portion 112 and the intermediate tank portion 114 and the intermediate tank portion 114 and the lower tank portion 116. The restriction apertures 128 allow flow of oil through the oil tank 102 between portions, whilst acting the limit the cross-sectional area of the oil tank 102 from which drips may pass between portions of the oil tank 102 without coming into contact with the waisted section 118.

As can be seen, the restriction apertures 128 of the waisted sections 118 are horizontally offset in order that it is impossible for vertically-falling drips of oil to fall from the upper tank portion 112 to the lower tank portion 114 without encountering at least one of the waisted sections 118. Preferably, oil drips will encounter both waisted sections 118, ensuring that re-aeration of the oil is kept to a minimum; however, it will be appreciated that it is not possible to ensure that this is the case with all oil drips, where waisted sections 118 are provided.

Of course, where more than two waisted sections 118 are provided, it is only necessary for adjacent restriction apertures 128 to be horizontally offset, and therefore non-adjacent restriction apertures 128 may be horizontally-aligned, if desired.

The narrowing and widening portions 122, 124 may act to ensure that oil, once adhered to the surface 126 of the waisted section 118, flows down the waisted section 118 and onto the walls 130 of the oil tank 102. As such, dripping may be prevented substantially completely once past the second of the waisted sections 118.

Although simply shown as a waisted section 118 with narrowing and widening portions 122, 124, the surface 126 of the waisted section 118 may additionally or alternatively be configured to enhance the adhesion of oil to the surface 126 in order to prevent or limit the formation of drips from the surface 126 of the waisted section 118.

The term "adhesion" is considered to include all types of adhesion such as mechanical adhesion and dispersive adhesion, as well as any other mechanism by which oil can be encouraged to remain in contact with the surface 126 of the waisted section 118.

Mechanical adhesion may be enhanced through the use of particular surface features, patterns, etc. For example, mechanical adhesion may be enhanced by the provision of channels, pores, ridges, protrusions, or undulations, either on the micro- or macro-scale, which act to keep the oil in adherence with the surface.

Alternatively or additionally, the surface may include materials that act to increase a dispersive adhesion with the particular composition of oil used within the oil tank system.

The oil tank system also includes two air communication lines 132. The air communication lines 132 interlink the upper tank portion 112 with each of the lower tank portion 114 and the intermediate tank portion 116. These act to provide an additional interconnection between the portions of the oil tank 102 and thus prevent the formation of air pockets within the oil tank 102. The air communication lines 132 therefore support the changes in oil level that may occur during changing engine operating conditions and changing oil consumption during a flight.

Moreover, sensors such as oil level sensors and/or oil temperature sensors may be included within the air communication lines 132 in order to allow monitoring of the oil level or oil temperature. The air communication lines 132 may run remotely from the oil tank 102 in order to provide easier access for a user to monitor temperatures or levels.

Figure 7:
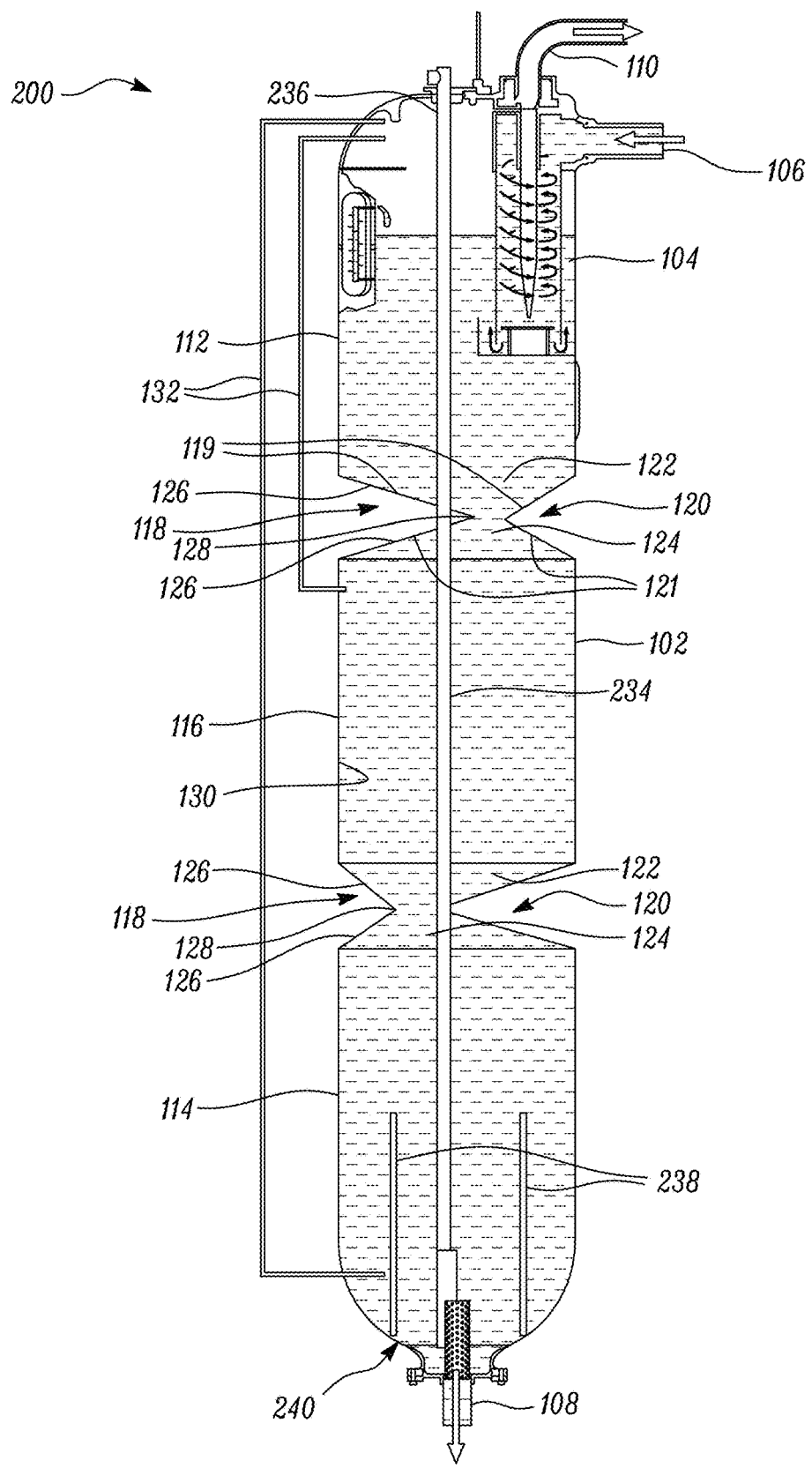
FIG. 7 is a sectional view of a second embodiment of the oil tank system of the present disclosure.

A second embodiment of an oil tank system 200 is shown in FIG. 7. Where features of the oil tank system are identical, identical reference numerals are used.

In addition to the features of the first embodiment of the oil tank system 100, the second embodiment includes an electronic oil level sensor 234. The electronic oil level sensor 234 runs internally to the oil tank 102 from the lower tank portion 114 to an outlet 236. The inclusion of the outlet 236 with the electronic oil level sensor 234 allows the electronic oil level sensor 234 to also provide an outlet for air, decreasing the chance of formation of an air pocket within the oil. The electronic oil level sensor 234 is provided in addition to the air communication lines 132, but either of these features may be provided separately from the other. If air pocket prevention is not required, this functionality may be omitted entirely.

The oil tank system 200 also includes two baffles 238 that extend upwards from a base 240 of the lower tank portion 114. The baffles 238 act to reduce swirling in the oil stored within the tank 102, this swirling being capable of increasing aeration within the oil. Thus, the baffles 238 act to prevent further aeration of the oil. Although two baffles 238 are shown, a greater or lesser number of baffles 238 may be provided. The baffles 238 extend up in a substantially vertical direction, but may extend in any other direction depending on design requirements and limitations.

Although only shown in respect of the lower tank portion 114, the baffles 238 may be provided, in addition or alternatively, within the upper tank portion 112 or the intermediate tank portion 116. For example, baffles 238 may extend upwards from the waisted section 118 or waisted sections 118 in order to prevent swirling further up the oil tank 102.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An oil tank system for a gas turbine engine, the oil tank system comprising:
    an oil tank having an upper tank portion and a lower tank portion, the lower tank portion including an oil tank outlet; and
    a de-aerator configured to receive scavenged oil from a scavenged oil supply inlet and remove air from the scavenged oil, a remainder of the scavenged oil passing to the upper tank portion;
    wherein the oil tank includes a plurality of waisted sections between the upper tank portion and the lower tank portion defining at least one intermediate tank portion, a waisted section being a section or cross-section of the oil tank that has a circumference that is smaller than the average circumference of the upper tank portion and the lower tank portion of the oil tank, each waisted section having an upper face configured to catch oil from above the waisted section and to guide oil to a lower face of the waisted section.

2. The oil tank system of claim 1, wherein the oil tank comprises a total of two to five waisted sections.

3. The oil tank system of claim 1, wherein the waisted section includes a sloped portion.

4. The oil tank system of claim 3, wherein the sloped portion includes a narrowing portion formed by the upper face and a widening portion formed by the lower face.

5. The oil tank system of claim 1, wherein the waisted section forms a restriction aperture.

6. The oil tank of claim 1, wherein each waisted section forms a restriction aperture and adjacent restriction apertures are horizontally-offset from each other for preventing the dripping of oil through two restriction apertures without contacting either waisted section.

7. The oil tank system of claim 1, further comprising an air communication line between the upper tank portion and the lower tank portion or the intermediate tank portion.

8. The oil tank system of claim 1, further comprising an oil level sensor and/or an oil temperature sensor.

9. The oil tank system of claim 7, further comprising an oil level sensor and/or an oil temperature sensor, and the oil level sensor and/or the oil temperature sensor are provided on the air communication line.

10. The oil tank system of claim 1, wherein the oil tank includes at least one baffle.

11. The oil tank system of claim 10, wherein the or each baffle is configured to reduce swirling of oil within the oil tank.

12. The oil tank system of claim 10, wherein the or each baffle is substantially vertical.

13. The oil tank system of claim 1, wherein the de-aerator includes a venting pipe for the removal of air.

14. A gas turbine engine for an aircraft, the gas turbine engine comprising:
    an engine core comprising a turbine, a compressor, and a core shaft connecting the turbine to the compressor;
    a fan located upstream of the engine core, the fan comprising a plurality of fan blades; and
    an oil tank system according to claim 1.

15. The gas turbine engine of claim 14 further comprising a gearbox that receives an input from the core shaft and outputs drive to the fan so as to drive the fan at a lower rotational speed than the core shaft.

16. The gas turbine engine of claim 14, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, second compressor, and second core shaft are arranged to rotate at a higher rotational speed than the first core shaft.

17. An aircraft including a gas turbine engine according to claim 1.

* * * * *